United States Patent [19]

Prud'Homme Van Reine et al.

[11] Patent Number: 4,699,774

[45] Date of Patent: Oct. 13, 1987

[54] GAS-TIGHT SINTERED TRANSLUCENT ALUMINUM OXIDE AND METHOD

[75] Inventors: Peter R. Prud'Homme Van Reine, Eindhoven; Gerardus H. M. Siebers, Roosendaal, both of Netherlands

[73] Assignee: U.S. Philips Corporation, New York, N.Y.

[21] Appl. No.: 903,937

[22] Filed: Sep. 4, 1986

[30] Foreign Application Priority Data

Sep. 9, 1985 [NL] Netherlands ............... 8502457

[51] Int. Cl.⁴ .............................................. C01F 7/02
[52] U.S. Cl. ................................... 423/625; 423/21.1; 423/115; 423/263; 423/266; 423/275; 501/152; 501/153
[58] Field of Search ............... 423/21.1, 115, 263, 423/266, 275, 625; 501/152, 153

[56] References Cited

U.S. PATENT DOCUMENTS 3,834,915 9/1974 Cleveland et al. .................. 501/153
3,905,845 9/1975 Kobayashi et al. ................. 501/153
4,214,666 7/1980 Oda et al. ............................ 423/625
4,222,978 9/1980 Oda et al. ............................ 423/625

OTHER PUBLICATIONS

Yogyo-Kyokai-Shi 87, No. 12, 1979, pp. 633–641.
Yogyo-Kyokai-Shi 88, No. 11, 1980, pp. 660–673.
Yogyo-Kyokai-Shi 88, No. 9, 1980, pp. 531–538.

*Primary Examiner*—Patrick P. Garvin
*Assistant Examiner*—Paige C. Harvey
*Attorney, Agent, or Firm*—John C. Fox

[57] ABSTRACT

The invention relates to gas-tight sintered translucent aluminum oxide having a density of at least 99.5%, which contains at most 1000 ppm by weight of MgO. According to the invention, the aluminum oxide also has a content of $Er_2O_3$ lying between 20 ppm by weight and 200 ppm by weight. The material thus obtained has a great mechanical strength, a high resistance to attack by sodium and a satisfactory translucence. Thus, the material is very suitable for use as wall material for the discharge vessels of high-pressure discharge lamps.

8 Claims, No Drawings

GAS-TIGHT SINTERED TRANSLUCENT ALUMINUM OXIDE AND METHOD

BACKGROUND OF THE INVENTION

The invention relates to gas-tight sintered translucent aluminium oxide having a density of at least 99.5% and containing MgO in a quantity of at most 1000 ppm by weight. The invention further relates to a method of manufacturing an article from this material. Such a material is known from U.S. Pat. No. 3,905,845. The known material is gas-tight, is highly translucent and is widely used inter alia in discharge vessels of high-pressure discharge lamps. Besides MgO, $Y_2O_3$ and $La_2O_3$ are added in order to obtain a satisfactory density and a regular crystal size distribution of the sintered material. However, the addition of $Y_2O_3$ and $La_2O_3$ can give rise to $\beta$ aluminate crystal structures, which adversely affect the durability of the material. Especially in the case of the use as a wall of a discharge vessel in which sodium is incorporated, it is found that the $\beta$ aluminate structure can be very readily attacked by the Na.

The invention has for its object to provide a measure for obtaining gas-tight sintered translucent aluminium oxide having a regular crystal size distribution and being free from $\beta$ aluminate structure.

SUMMARY OF THE INVENTION

For this purpose, according to the invention, a material of the kind mentioned in the opening paragraph is characterized in that the aluminium oxide also contains erbium (Er) in a quantity, expressed in $Er_2O_3$, of at least 20 ppm by weight and at most 200 ppm by weight.

The material according to the invention has a regular crystal size distribution and is highly translucent in sintered form. Besides, the material is found to be highly durable against the attack by sodium. An advantage of the material is that especially Ca impurity in the material is segregated at crystal boundaries in an ErCa aluminate. It is further ascertained that the ErCa structure is not of the $\beta$ type, which has a favourable influence on the durability against the attack by sodium. Thus, the material according to the invention is particularly suitable for use as wall material of discharge vessels of high-pressure discharge lamps.

A content of Er lower than 20 ppm by weight results in the material having an irregular crystal size distribution; especially the surface is coarse-crystalline and has many pores. This is due to the evaporation of MgO from the surface layer during sintering, as a result of which an unhindered crystal growth can occur.

A content of Er higher than is required for obtaining a regular crystal size distribution is found to lead to an irregular grain growth. It has been found that even under very favourable conditions, with an Er content higher than 200 ppm by weight the phenomenon of irregular grain growth occurs, as a result of which a secondary crystallization can occur. Both the density and the extent of translucence are unfavourably influenced thereby.

The addition of $Er_2O_3$ as a dopant during sintering of aluminium oxide is known from literature. (Yogyo-Kyokai-Shi 87, No. 12, 1979, pp. 633–641; 88, No. 11, 1980, pp. 660–673; 88, No. 9, 1980, pp. 531–538). In all cases, however, quantities of 500 ppm by weight or more are concerned. Gas-tight translucent aluminium oxide is found to be not realizable at such high concentrations of Er, however.

In a preferred embodiment of a material according to the invention, the content of MgO is lower than 500 ppm by weight and the Er content, expressed in $Er_2O_3$ is at most 130 ppm by weight. This material has the advantage that a strong homogeneous gas-tight and translucent material is obtained having a very high durability against attack by sodium. The small quantity of MgO is found to be favourable for the durability of the material. A possible explanation for this fact is that no Mg-containing second-phase separation occurs. The $Er_2O_3$ promotes a homogeneous crystal size distribution in spite of the small quantity of MgO in the material.

An article of gas-tight sintered translucent aluminium oxide according to the invention is preferably manufactured by means of a method which is characterized in that an MgO compound is added to a powder mixture of $Al_2O_3$ is that the $Al_2O_3$ powder thus obtained is shaped preferably after disagglomeration into a desired moulding and is then heated in an oxidizing atmosphere at a temperature between 1150° and 1400°, in that subsequently a desired quantity of $Er_2O_3$ is added to the moulding by impregnation with an Er-containing solution, and in that thereafter the moulding is sintered in hydrogen or in a vacuum at a pressure of at most 0.13 Pa at a temperature of at most 1800° C.

Preferably, the Er-containing solution consists of an Er acetyl acetonate solution in alcohol. An advantage is that this solution can be obtained in a simple manner and that impregnation of mouldings in this solution leads to reasonably reproducible results. A further advantage is that in this method the content of $Er_2O_3$ added to the mouldings can be varied in a very simple manner on the one hand by variation in time of impregnation and on the other hand by variation in Er concentration in the solution.

EXAMPLE

A number of cylindrical tubes have been manufactured using as starting material disagglomerated $Al_2O_3$ powder having a purity of 99.99% and a specific surface area of 6 m/g, to which an MgO dopant is added during the preparation of a kneading mass, whereupon these tubes are shaped by means of extrusion and are then baked out in air at a temperature of 1280° C. Subsequently, a number of the cylindrical tubes thus obtained are immersed in a solution of Er acetyl acetonate in alcohol. By variation in the concentration of the Er acetyl acetonate and in the time of immersion, different Er dopant contents are obtained.

Subsequently, the tubes are sintered for 5 hours at a temperature of 1750° C. in hydrogen to translucent gas-tight tubes. The sintered tubes have a wall thickness of 6 mm. A large number of properties of the tubes thus obtained have been determined. The following table indicates the compositions and the properties of the different articles.

In the columns under the headings $G_{max}$ and $G_{gem}$, the maximum crystal size and the average crystal size, respectively, each expressed in $\mu m$, are stated. This crystal size is determined by means of electron microscopy.

The mechanical strength expressed in $MN/m^2$, is stated in the column under the heading $\sigma_f$ and is determined by means of the ring test method. The extent of translucence is determined by means of a rectilinear light transmission measurement and the results are stated in the column under the heading RLD, expressed in a relative measure.

A penetration depth of sodium of a number of tubes is determined by arranging the tubes concerned in a molybdenum vessel, which also contains amalgam comprising 30% by weight of sodium and is heated for 100 hours at 1100° C. Subsequently, the tubes are given polished and etched cross-sections, at which the penetration depth of sodium into the crystals is determined by means of microspectral analysis.

The tubes enumerated 2 to 6 consist of aluminium oxide according to the invention. In comparison with a tube without Er (No. 1) or having too high an Er content (7), the tubes 2 to 6 have a regular crystal size distribution. The average crystal size of the tubes 2 to 6 is comparatively small as compared with that of the tubes 1 and 7, which accounts for the lower values for the translucence of the tubes 2 to 6 with respect to that of the tubes 1 and 7. On the contrary, the mechanical strength is considerably greater.

The sodium penetration depth of the tubes 1, 3 and 4 is determined by means of the method described above. It then appears that for the tube 1 the penetration depth is larger than 250 μm and that an attack on the crystal boundaries can be observed throughout the wall thickness. For the tubes 3 and 4, the penetration depth is 600 and 50 μm, respectively, while in none of the two cases a preferential attack of the crystal boundaries can be observed.

ppm by weight and the Er content, expressed in $Er_2O_3$, is from about 20 to about 130 ppm by weight.

3. A method of manufacturing an article from gas-tight sintered aluminum oxide as claimed in claim 2, characterized in that: an MgO compound is added to a powder mixture of $Al_2O_3$; the $Al_2O_3$ powder thus obtained is shaped into a desired moulding and is then heated in an oxidizing atmosphere at a temperature between 1150° C. and 1400° C.; a desired quantity of $Er_2O_3$ is then added to the moulding by impregnation with an Er-containing solution; and thereafter the moulding is sintered in hydrogen or in a vacuum at a pressure of up to about 0.13 Pa and at a temperature of up to about 1800° C.

4. A method as claimed in claim 3, characterized in that the Er-containing soluiton consists of an Er acetyl acetonate solution in alcohol.

5. A method of manufacturing an article from gas-tight sintered aluminum oxide as claimed in claim 1, characterized in that an MgO compound is added to a powder mixture of $Al_2O_3$, in that the $Al_2O_3$ powder thus obtained is shaped, after disagglomeration, into a desired moulding and is then heated in an oxidizing atmosphere at a temperature between 1150° C. and 1400° C., in that a desired quantity of $Er_2O_3$ is then added to the moulding by impregnation in an Er-containing solution, and in that thereafter the moulding is sintered in hydrogen or in a vacuum at a pressure of at most 0.13 Pa at a temperature of at most 1800° C.

TABLE

| No. | MgO % by weight | $Er_2O_3$ % by weight | $G_{max}$ μm | $G_{gem}$ μm | $\sigma_f$ | RLD | penetration depth Na |
|---|---|---|---|---|---|---|---|
| 1 | 300 | 0 | >300 | 20 | 135 | 157 | >250 μm crystal size overall wall thickness |
| 2 | 300 | 20 | 35 | 12 | 296 | 138 | |
| 3 | 300 | 50 | 35 | 12 | 296 | 122 | 60 μm with preferential crystal boundary |
| 4 | 300 | 125 | 100 | 18 | 238 | 142 | 50 μm with preferential crystal boundary |
| 5 | 1000 | 20 | 35 | 12 | 322 | 131 | |
| 6 | 1000 | 50 | 60 | 14 | 251 | 125 | |
| 7 | 1000 | 390 | 150 | 30 | 187 | 167 | |

What is claimed is:

1. A gas-tight sintered translucent aluminum oxide having a density of at least 99.5% containing MgO in a quantity of from zero to about 1000 ppm by weight, characterized in that the aluminum oxide contains erbium (Er) in a quantity, expressed in $Er_2O_3$, of from about 20 ppm by weight to about 200 ppm by weight.

2. Aluminum oxide as claimed in claim 1, characterized in that the MgO content is from zero to about 500

6. A method as claimed in claim 5, characterized in that the Er-containing solution consists of an Er acetyl acetonate solution in alcohol.

7. A method as claimed in claim 3, characterized in that the $Al_2O_3$ powder is disagglomerated prior to shaping.

8. A method as claimed in claim 5, characterized in that the $Al_2O_3$ powder is disagglomerated prior to shaping.

* * * * *